United States Patent [19]

Johnson

[11] Patent Number: 5,029,905

[45] Date of Patent: Jul. 9, 1991

[54] COUPLING APPARATUS FOR REPAIRING ASBESTOS CEMENT PIPE

[76] Inventor: Lance W. Johnson, 2291 Alluvial, Clovis, Calif. 93612

[21] Appl. No.: 341,050

[22] Filed: Apr. 20, 1989

[51] Int. Cl.$^5$ ................................................ F16L 21/02
[52] U.S. Cl. ........................................ 285/31; 285/369
[58] Field of Search .................................. 285/364, 31

[56] References Cited

U.S. PATENT DOCUMENTS

| | | |
|---|---|---|
| 2,595,705 | 5/1952 | Rosecrans .......................... 285/31 |
| 2,738,992 | 3/1956 | Heisler . |
| 2,914,347 | 11/1959 | Magnani . |
| 3,637,239 | 1/1972 | Daniel .......................... 285/369 X |
| 3,826,521 | 7/1974 | Wilhelms . |
| 3,884,508 | 5/1975 | Jones . |
| 4,049,480 | 9/1977 | Kutschke . |
| 4,521,037 | 6/1985 | Knox .............................. 285/31 X |
| 4,690,434 | 9/1987 | Schmidt ............................ 285/31 |

OTHER PUBLICATIONS

Installation Instruction, 8pp. CertainTeed Corporation.

*Primary Examiner*—Dave W. Arola
*Attorney, Agent, or Firm*—Godfrey & Kahn

[57] ABSTRACT

A coupling apparatus for connecting a pair of asbestos-cement pipes in fluid communication with a replacement pipe, the coupling apparatus including a coupling assembly having a bore which is dimensioned telescopingly to receive the spigot ends of the asbestos-cement pipe, and the replacement pipe, and a pair of sealing members are mounted in the bore and are individually adapted to sealingly engage the spigot end of the asbestos-cement pipe and the replacement pipe respectively. The invention also relates to a method for repairing asbestos-cement pipe and which includes the steps of determining the linear distance between two adjoining sections of asbestos-cement pipe, cutting a replacement pipe to a desired length, sliding a coupler assembly on the opposite ends of the replacement pipe, aligning the replacement pipe in substantially coaxial alignment with the asbestos-cement pipes to be joined, and sliding the individual coupler assemblies over the ends of the asbestos-cement pipe thereby coupling the pair of asbestos-cement pipes and the replacement pipe in fluid communication.

1 Claim, 2 Drawing Sheets

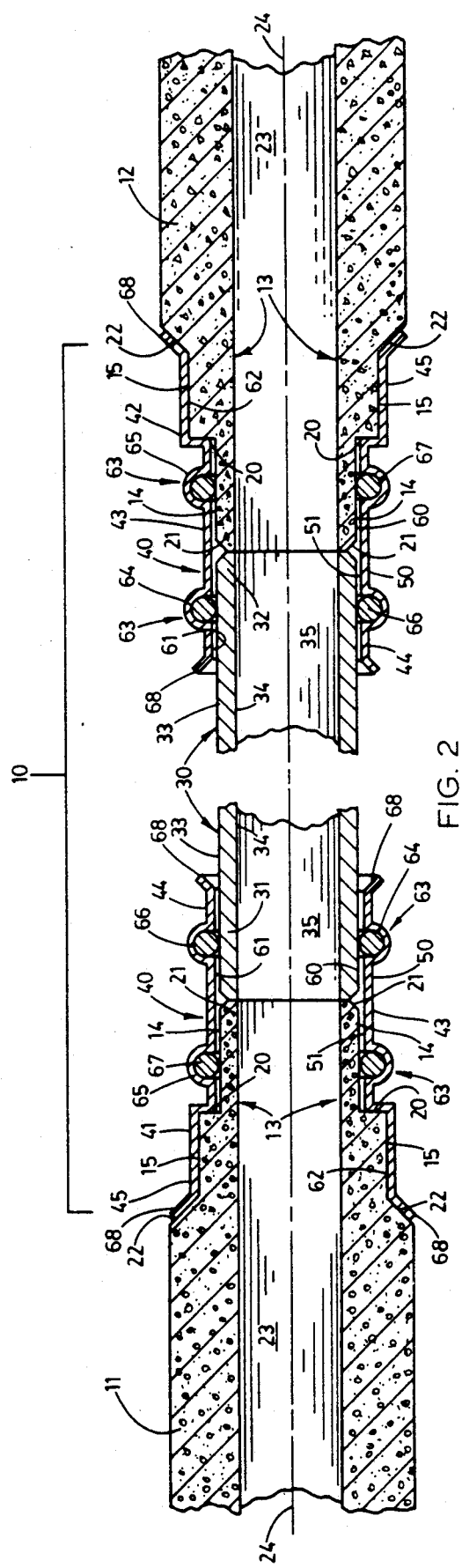

COUPLING APPARATUS FOR REPAIRING ASBESTOS CEMENT PIPE

BACKGROUND OF THE INVENTION

1. Field of the Invention

The present invention relates to a coupling apparatus for joining two discrete sections of asbestos-cement pipe in fluid communication, and to a method for repairing asbestos-cement pipe, the coupling apparatus, when properly mounted on an asbestos-cement pipe having utility in joining a replacement pipe in fluid communication with the individual discrete sections of asbestos-cement pipe, the coupling apparatus further making possible repair and replacement of a damaged section of asbestos-cement pipe with increased speed, safety, and dependability not possible heretofore.

2. Description of the Prior Art

Asbestos-cement pipe was first introduced into the U.S. in 1929. By 1974, an estimated 200,000 miles of asbestos cement pipe had been installed and recent estimates indicate that this figure may now be roughly 400,000 miles. Asbestos-cement pipe has been manufactured in various sizes from as small as 4 inches in diameter through as large 39 inches. It should be understood that asbestos-cement pipe has been primarily employed for water or fluid transmission in municipal, industrial, and agricultural applications.

Recent studies have linked the ingestion of asbestos fibers with lung and gastrointestinal cancer in human beings. In response to these studies the Environmental Protection Agency has proposed a ban on all asbestos products, including asbestos-cement pipe. Further, the greater availability, and cost effectiveness of polyvinyl-chloride, (PVC) pipe, as well as a general reduction in large scale pipeline water projects throughout the United States has led to a dramatic reduction in the demand for asbestos-cement pipe. With a lack of consumer demand for such a product, and with the assorted environmental regulations which may restrict the utilization of such a product, manufacturers of asbestos-cement pipe products have correspondingly reduced their production levels, as well as limited the numbers and types and sizes of related asbestos-cement products produced. For example, asbestos-cement pipe in diameters larger than 21 inches is no longer commercially available. Further, asbestos-cement pipe in sizes of 14 through 21 inches are only manufactured by one company in the United States, and then in that instance, only on a special order basis which requires some five to eight months for manufacture. Further, other manufacturers of asbestos-cement pipe have decided to completely abandon manufacturing these products.

With nearly 400,000 miles of asbestos-cement pipe in use, repair of such pipelines becomes a serious problem. In addition, and compounding the repair problem is that prior to 1971, dimensional standards in the asbestos-cement pipe industry did not exist. Therefore, different brands of asbestos-cement pipe could not necessarily be utilized together, nor could post 1971 asbestos-cement pipe necessarily be utilized in combination with 1971 and earlier dimensioned asbestos-cement pipe.

Repair kits for repairing damaged sections of asbestos-cement pipe have been commercially available. Such kits have been manufactured by the CertainTeed Corporation, of Riverside, CA, CAPCO Pipe Co. of Birmingham AL; and the Ershigs Corporation of Bellingham, WA.

While these prior art asbestos-cement pipe repair kits have operated with varying degrees of success, they commonly possess shortcomings which have detracted from their usefulness. For example, the asbestos-cement pipe repair kit marketed by CertainTeed Corporation includes a multiplicity of various parts and which are operable, in various combinations, to close assorted distances between adjoining sections of asbestos-cement pipe. These closure distances are in a range from zero to 13 feet. The repair kit provided by Certain Teed Corporation includes elements which are manufactured from asbestos-cement. With respect to the asbestos-cement pipe repair kit manufactured by Ershigs Corporation, the components of this kit are manufactured from fiberglass. While fiberglass does not present an environmental hazard as serious as asbestos, it may be cost prohibitive. For example the Ershigs Repair kit is approximately four times the cost of a comparable asbestos-cement pipe repair kit. Further, the Ershigs Corporation appears to manufacture the only repair kit which is available to repair asbestos-cement pipes which have outside diameters greater than 21 inches.

Still other significant problems results from the prior art devises and practices. For example, and in the event that the closure distance between the adjoining sections of asbestos-cement pipe does not coincide with the repair kit as provided, than in that instance, repair of a damaged asbestos-cement pipe becomes more difficult. In these situations, a field cut and/or machining of the asbestos-cement pipe would be required. This field cut and/or machining usually produces a significant volume of asbestos dust which requires special safety procedures. The overall procedure is very time consuming and very costly. This procedure, of course, assumes that an asbestos-cement pipe repair kit is available.

Therefore, it has long been know that it would be desirable to have a coupling apparatus, and a method for repairing asbestos-cement pipe, and which has particular utility in coupling a replacement pipe in fluid communication with a pair of discrete asbestos-cement pipes, the coupling apparatus operable substantially to reduce the time needed to repair a damaged section of asbestos-cement pipe while simultaneously increasing the effectiveness and worker safety thereof, with the attend economic benefits to be derived from such effective repairs.

SUMMARY OF THE INVENTION

Therefore, it is an object of the present invention to provide an improved coupling apparatus, and method for repairing asbestos-cement pipes.

Another object of the present invention is to provide a coupling apparatus which has particular utility when coupling a replacement pipe in fluid communication with a pair of spaced asbestos-cement pipes.

Another object of the present invention is to provide such a coupling apparatus which can be easily installed in fluid sealing relation about the spigot end of an asbestos-cement pipe, and which is further adapted to sealingly engage a replacement pipe thereby connecting the asbestos-cement pipe and the replacement pipe in fluid communication.

Another object of the present invention is to provide a repair kit for repairing an asbestos-cement pipe and more particularly to such a repair kit which includes a pair of coupling assemblies, and a replacement pipe having a predetermined linear length and diametral dimension.

Another object of the present invention is to provide a repair kit for repairing asbestos-cement pipe and which is operable to permit repair of a damaged section of asbestos-cement pipe, but does not require activities with the asbestos-cement pipe which would generate any environmentally significant volume of asbestos dust.

Another object of the present invention is to provide a coupling apparatus which is operable to repair all sizes of commercially available and previously employed asbestos-cement pipe.

Another object of the present invention is to provide a coupling apparatus and method for repairing asbestos-cement pipe which is characterized by simplicity of design, ease of installation, and which can be sold at a relatively nominal price, when compared with related prior art devices.

Another object of the present invention is to provide a coupling apparatus, and a method for repairing asbestos-cement pipe, which is operable to obtain the individual benefits to be derived from related prior art devices and practices, while avoiding the detriments individually associated therewith.

Further objects and advantages are to provide improved elements and arrangements thereof in an apparatus, and a method for repairing asbestos-cement pipe for the purposes described, which are dependable, durable, and fully effective in accomplishing their intended purposes.

These and other objects and advantages are achieved in the coupling apparatus and method for repairing asbestos-cement pipe of the present invention wherein, in the preferred embodiment, the apparatus is operable to couple a spigot end of an asbestos-cement pipe in fluid communication with a replacement pipe, the coupler apparatus including a coupler assembly which defines a bore and which is dimensioned telescopingly to receive the spigot end of the asbestos-cement pipe, and the replacement pipe respectively, and a pair sealing members are mounted in the bore and are individually adapted to sealingly engage the spigot end of the asbestos-cement pipe and the replacement pipe, respectively, thereby connecting the replacement pipe and the asbestos-cement pipe in fluid communication.

BRIEF DESCRIPTION OF THE DRAWINGS

FIG. 2 is a fragmentary, longitudinal, vertical, sectional view of the coupling apparatus of the present invention taken from a position along line 2—2 of FIG. 1.

FIG. 3 is a transverse, vertical, sectional view taken from a position along line 3—3 of FIG. 1.

DESCRIPTION OF THE PREFERRED EMBODIMENT

Figure 1:
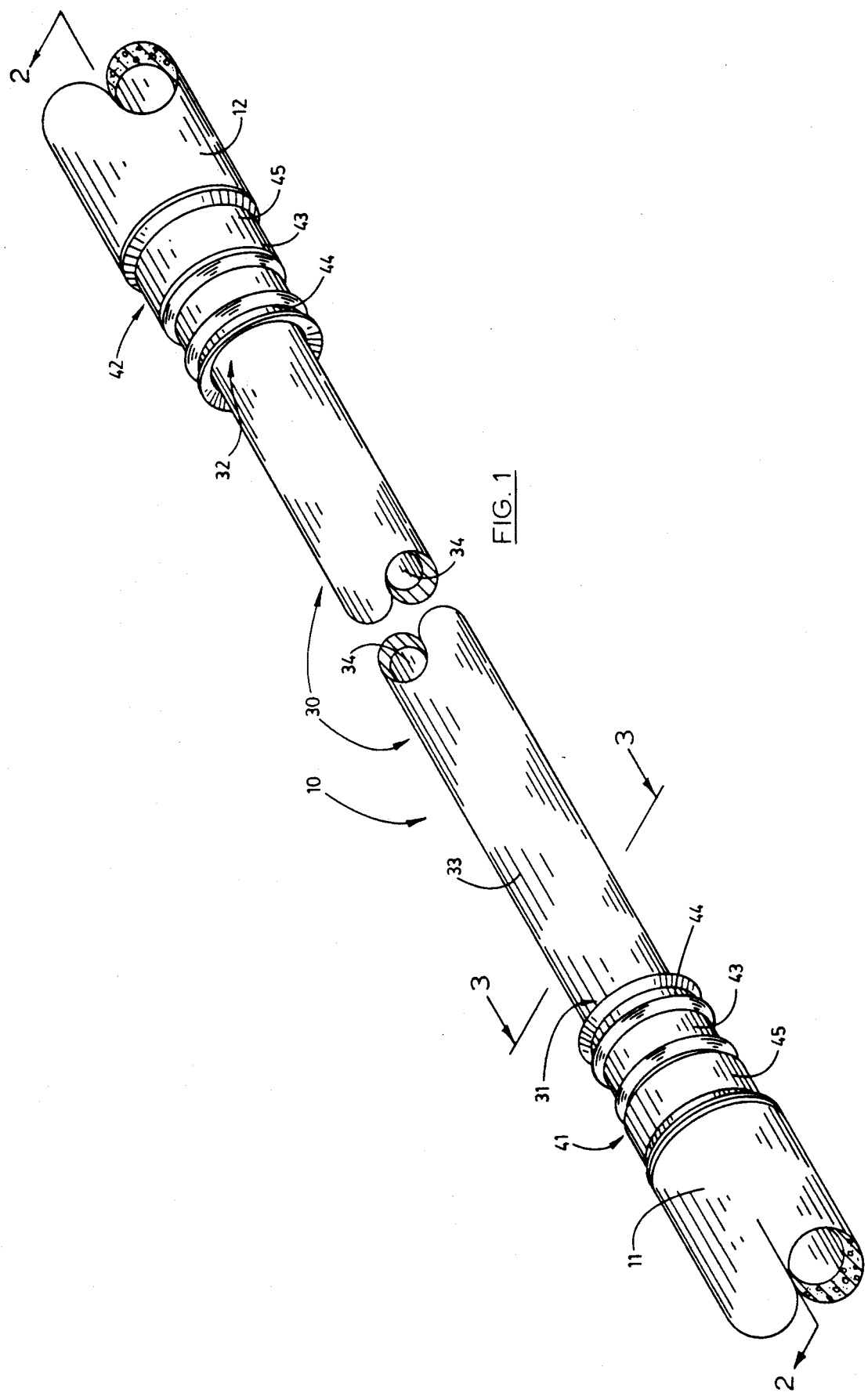
FIG. 1 is a perspective view of coupling apparatus of the present invention shown in a typical operative configuration.

Referring more particularly to the drawings, the coupling apparatus embodying the principles of the present invention is generally indicated by the numeral 10 in FIG. 1. For illustrative convenience, the apparatus 10 is shown and described herein in a typical operative environment wherein it is depicted as connecting discreet, first and second sections of spaced apart asbestos-cement pipe hereinafter designated by the numerals 11 and 12 respectively. Each section of asbestos-cement pipe 11 and 12 includes a spigot end 13 which is defined by a first reduced outside diameter portion 14 and a second reduced outside diameter portion 15. As best illustrated by reference to FIG. 2 the second reduced outside diameter portion 15 has a greater outside diametral dimension then the first reduced outside diameter portion, but this dimension is less than the outside diameter dimension of the asbestos-cement pipes 11 or 12 respectively. A vertical edge 20 is positioned between the first and second reduced outside diameter portions, and a first tapering edge 21 is located between the first reduced outside diameter portion, and the distal end of the respective asbestos-cement pipes. The edge 20 may on occasion assume a beveled configuration. A second tapering edge 22 is positioned adjacent to the second reduced outside diameter portion. Each of the asbestos-cement pipes 11 and 12 have a passageway or channel or bore 23 which receives water or other fluids, and the passageway further has a longitudinal axis which is generally indicated by the line labeled 24.

A replacement pipe, which is generally indicated by the numeral 30 is cut to length such that it spans the distance between the spigot ends of the individual first and second asbestos-cement pipes 11 and 12 thereby connecting them in fluid communication. The replacement pipe may be manufactured out of assorted commercially available materials. However, the inventor believes polyvinylchloride (PVC) will probably be the preferred choice because of the ease with which it can be cut. Other suitable materials may include steel, fiberglass, cast iron, and ductile iron to name but a few. The replacement pipe has first and second spigot ends 31 and 32 respectively. Further the replacement pipe has an outside surface 33, and an inside surface 34 which defines a passageway or bore 35.

The replacement pipe 30 is sealingly joined to the individual spigot ends 13 of each of the asbestos-cement pipes 11 and 12 respectively by a coupler assembly, which is generally indicated by the numeral 40. As best illustrated by reference to FIG. 2 a first coupler assembly 41, and second coupler assembly 42 are individually slidably and sealingly mounted on the opposite spigot ends 31 and 32 of the replacement pipe 30. Each coupler assembly has a main body 43 which includes a first end 44 and an opposite second end 45. The main body of each coupler assembly may be manufactured from assorted materials, however the inventor believes the preferred material of choice will be an epoxy lined, and coated steel. Other preferred materials may include, for example, PVC, fiberglass, cast iron, and various plastics. Further, the coupler assemblies each have an outside surface 50 and an inside surface 51 which defines a substantially longitudinally disposed bore 60. The bore 60 has first and second portions 61 and 62 respectively. The first and second portions each have inside diametral dimensions which permits the spigot end 13 of one of the sections of asbestos-cement pipe 11 or 12 to be telescopingly received in the bore in longitudinal mating relation. More particularly, and as best seen by reference to FIG. 2 the second portion of the bore 60 has a predetermined inside diametral dimension which is larger than the inside diametral dimension of the first portion.

As best illustrated by reference to FIG. 2 a pair of annular seats, 63, and which include a first seat 64, and a second seat 65, are formed into the inside surface 51 and are positioned in the bore 60. The second seat 64 is positioned in closed proximity to the second portion 62 of the bore, and is also substantially intermediate the first and second ends 44 and 45 of the main body 43. Further the first seat is positioned adjacent to the first end 44. The first and second seats are operable to receive a first and second sealing member 66 and 67 respectively. The sealing members may be manufactured out of assorted materials including various elastomeric compounds. The first and second sealing members are individually operable to be disposed in fluid impeding relation between the inside surface of the main body and the spigot ends of the respective asbestos-cement pipes, and the replacement pipe 30. This is seen most clearly by reference to FIG. 2. The main body 43 of each coupler assembly has flared portions 68 which are individually positioned at its first and second ends, the individual flared portions are seen most clearly by reference to FIGS. 1 and 2.

OPERATION

The operation of the described embodiment of present invention is believed to be readily apparent and is briefly summarized at this point.

As best illustrated by reference to FIG. 2 a coupling apparatus 10 is operable to connect first and second asbestos-cement pipes 11 and 12 respectively in fluid communication. To utilize the subject apparatus it should be understood that a damaged section of asbestos-cement pipe previously joining the first and second asbestos-cement pipes will have been earlier removed. Once this step is accomplished, the linear distance between the distal ends of the first and second asbestoscement pipes will be determined. Following this determination, a suitable replacement pipe 30 having an outside diametral dimension approximately equal to the outside diameter dimension of the first reduced outside diameter portion 14, will be cut, if other than a standard length, to length such that it will span the distance between the distal ends of each section of asbestos-cement pipe. Upon accomplishing this step, the first and second coupler assemblies 41 and 42, respectively, will be slidably received on the opposite spigot ends 31 and 32 of the replacement pipe 30 and disposed in a first position longitudinally inwardly relative to the distal ends of the replacement pipe such that the second ends 45 of the individual coupler assemblies are individually positioned in substantially flush relation with respect to the distal ends of the replacement pipe 30. In this position, the replacement pipe 30 is moved into a position where it is disposed in substantially coaxial alignment and in fluid flow registry with the first and second asbestos-cement pipes 11 and 12 respectively. Upon accomplishing this step, the individual coupler assemblies are urged forwardly, and longitudinally relative to the replacement pipe and along opposite first and second paths of travel such that the first and second reduced outside diameter portions to the individual asbestos-cement pipes 11, and 12, can be received in telescoping relation in the bore 60 and in the fashion that is shown most clearly by reference to FIG. 2. When positioned in an appropriate fluid sealing attitude about the spigot end 13 of the first and second asbestos-cement pipes, the first and second sealing members are operable to sealingly engage the spigot ends of the replacement pipe 30 such that the individual asbestos-cement pipes and the replacement pipe 30 are connected in fluid communication one with the other.

Therefore, the coupling apparatus 10 for joining a pair of asbestos-cement pipes in fluid communication is adapted for use on a wide variety of differently dimensioned asbestos-cement pipes and further is adapted to be utilized in the form of a kit for repairing damaged asbestos-cement pipe. Further, the coupling apparatus is manufactured from material which is commercially available, may be readily machined, or field cut to length, and which does not create an environmental hazard, the coupling apparatus being manufactured and installed at a nominal price when compared with other related prior art devices, and practices.

Although the invention has been herein shown and described in what is conceived to be the most practical and preferred embodiment, it should be readily recognized that departures may be made therefrom, within the scope of the invention, which is not to be limited to the illustrated details disclosed.

Having described my invention what I claim is new and desire to secure by letters patent is:

1. A coupling kit having component part which are capable of being readily assembled at a remote location for joining in fluid flowing communication a pair of asbestos cement pipes which have individual spigot ends, and which are disposed in spaced relation one to the other, and wherein the spigot ends include first and second reduced outside diameter portions, and wherein the second reduced outside diameter portions have outside diametral dimensions which are greater than the outside diametral dimensions of the first reduced outside diameter portions, and wherein a discrete circumscribing edge separates the reduced diameter portions, one from the other, the coupling it comprising:

a polymer based replacement pipe having a length dimension which substantially spans the distance between the individual spigot ends, the replacement pipe having opposite first and second ends and interior and exterior surfaces, the interior surface defining a substantially uniform passageway, and the exterior surface defining an outside diametral dimension which is substantially equal to the outside diametral dimension of the first reduced diameter portion of the spigot ends; and a pair of couplers each having a main body with opposite first and second ends, and interior and exterior surfaces, and wherein the interior surface defines a longitudinally disposed bore having first and second portions which are separated by shoulder means and which have individual diametral dimensions which are greater than the outside diametral dimensions of the individual spigot ends, and wherein the first portion of the bore has formed therein a pair of annular seats which are disposed in circumscribing relation about the inside surface and which extend substantially radially outwardly relative thereto, the annular seats operable to receive individual deformable seals, and wherein the second portion of each of he bores has an inside diametral dimension which is greater than the outside diametral dimensions of the second reduced outside diameter portions, and wherein the first and second couplers are slideably and telescopingly received about the exterior surface of the first and second ends of the replacement pipe and are individually operable for substantially coaxial movement along individual paths of travel from a first position, wherein each of the couplers are disposed in a position longitudinally inwardly relative to the first and second ends of the replacement pipe, and wherein the second ends of each of the couplers are disposed in a substantially flush position relative to the first and second ends of the replacement pipe, to a second position, wherein the second ends of the respective couplers are located in a position longitudinally outwardly relative to the first and second ends of the replacement pipe and in telescoping mating receipt about the individual spigot ends, the individual first reduced diameter portions of the respective spigot ends slideably received in the first portion of the bore, and wherein the discrete edges of the spigot ends engage the shoulder means on the individual couplers thereby impeding the advance of the reduced outside diameter portions to a predetermined distance inside the first portion of each of ht bores, and wherein each pair of seals individually engage the respective opposite ends of the replacement pipe and the first reduced outside diameter portions of the respective spigot ends thereby connecting the replacement pipe in fluid flowing communication with the pair of asbestos cement pipes.

* * * * *

UNITED STATES PATENT AND TRADEMARK OFFICE
CERTIFICATE OF CORRECTION

PATENT NO. : 5,029,905

DATED : July 9, 1991

INVENTOR(S) : Lance W. Johnson

It is certified that error appears in the above-identified patent and that said Letters Patent is hereby corrected as shown below:

Column 5, line 58, delete the word "to" and insert --of--;

Column 6, line 21, delete the word "part" and insert --parts--;

Column 6, line 33, delete the word "it" and insert --kit--;

Column 6, line 58, delete the word "he" and insert --the--;

Column 8, line 5, delete the letters "ht" and insert --the--.

Signed and Sealed this

First Day of December, 1992

Attest:

DOUGLAS B. COMER

*Attesting Officer*  *Acting Commissioner of Patents and Trademarks*